United States Patent [19]

Horton

[11] Patent Number: 4,898,697

[45] Date of Patent: Feb. 6, 1990

[54] ROTATIONAL SLUSH MOLDING METHOD

[75] Inventor: Roger L. Horton, Somersworth, N.H.

[73] Assignee: Davidson Textron Inc., Dover, N.H.

[21] Appl. No.: 289,024

[22] Filed: Dec. 23, 1988

[51] Int. Cl.$^4$ .......................... B29C 41/18; B28B 5/06
[52] U.S. Cl. .................................... 264/37; 264/297.6;
264/297.8; 264/302; 264/310; 264/DIG. 60;
425/425; 425/434
[58] Field of Search ................ 425/429, 430, 434, 435,
425/433, 425, 576, 453; 264/297.6, 297.1, 297.7,
299, 302, 309, 310, 311, 312, DIG. 60, 297.3,
297.8

[56] References Cited

U.S. PATENT DOCUMENTS

| | | | |
|---|---|---|---|
| 1,488,973 | 4/1924 | Brookes | 264/302 |
| 2,834,986 | 5/1958 | Bailey et al. | 425/430 |
| 4,056,590 | 11/1977 | Farrell | 264/538 |

Primary Examiner—Jeffery Thurlow
Assistant Examiner—Mathieu Vargot
Attorney, Agent, or Firm—John C. Evans

[57] ABSTRACT

A rotational molding process for slush casting mold with plastisol includes providing a conveyor having a plurality of spaced reversing arm assemblies, each arm assembly having opposite ends carrying molds thereon; providing first and second conveyor paths for the molds on the opposite ends of each arm assembly and locating one of the first and second conveyor paths inside the outer perimeter of the other of the first and second conveyor paths; preheating a mold on one of the arm assemblies on the first conveyor path and filling the preheated mold with an excessive charge of plastisol to form a gel layer thereon while on the first conveyor path and thereafter dumping plastisol from the preheated mold for return to a supply source of plastisol; and simultaneously curing a gel layer on another of the arm assemblies by directing the mold through the second conveyor path as the preheated mold on the other end of the arm assembly is being filled and dumped whereby the movement of an arm assembly produces simultaneous filling and curing of a mold on one of the arm assemblies and simultaneous dumping and curing of a mold on another of the arm assemblies.

4 Claims, 4 Drawing Sheets

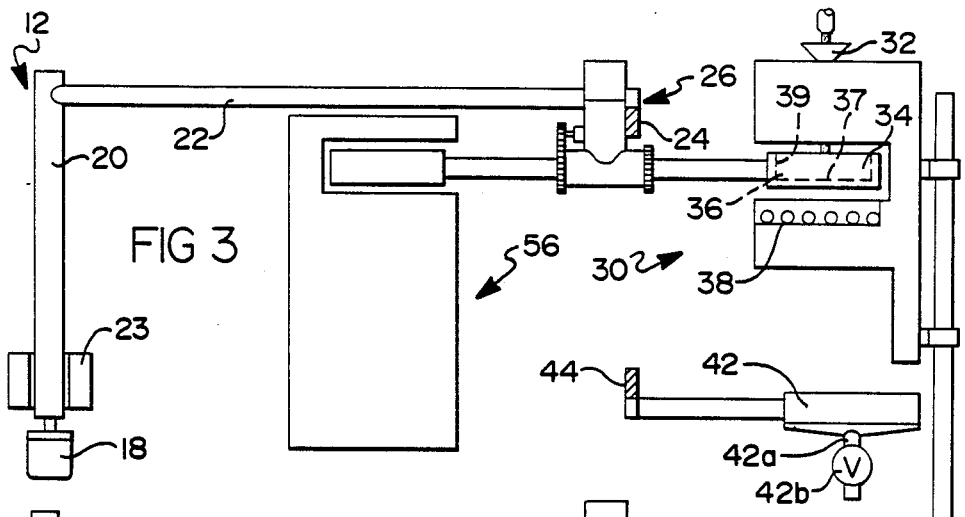
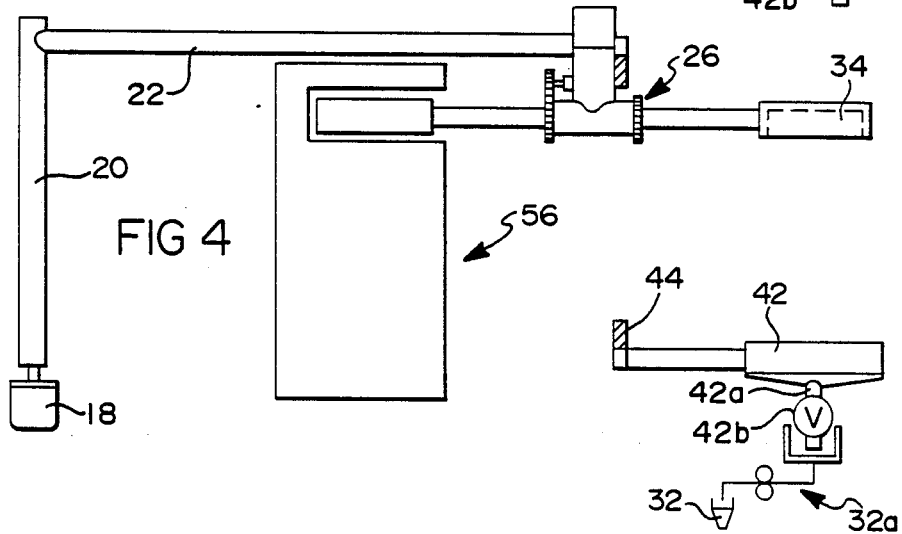
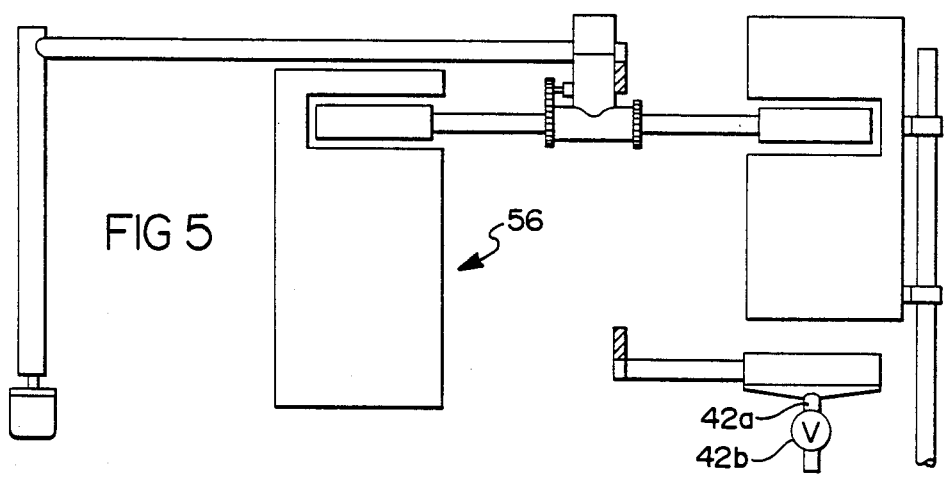

ROTATIONAL SLUSH MOLDING METHOD

BACKGROUND OF THE INVENTION

The invention relates to rotational mold apparatus and, more particularly, to rotational mold apparatus for melting a slush casting material on a heated mold to form a gel layer thereon which is subsequently cured by passage through a curing oven.

Various proposals have been suggested for directing liquid slush casting plastisol or dry powder slush casting material onto heated mold surfaces for forming a gel layer thereon of plastisol. Excess material is removed from the mold by extracting excess material therefrom either by pumping or dumping the excess material out of the mold and thereafter the gelled layer is subsequently cured.

An example of such a system is set forth in U.S. Pat. No. 4,389,177 wherein selective areas of a heated slush casting mold are maintained at different temperatures to control the rate of buildup of the gelled layer on the part. The '177 patent discloses a single mold, modular slush molding machine for manufacturing individual ones of such instrument panels. The machine is not adaptable to processing of a series of molds on a high volume, continuous assembly line basis.

U.S. Pat. No. 4,690,626 discloses a rotational mold system having multiple stations for cooling molded parts following heating at a centrally located heat source. A plurality of mold supports are located around an outer circular conveyor line. The mold tools are moved along the outer circular conveyor path until they are aligned with one of a plurality of radially inwardly directed conveyor paths. Then the tools are conveyed to the heat sources. Thereafter they are moved along the same radial path into alignment with a mold cooling chamber.

The '626 patent does not provide a cure path for fusing gelled plastic material on the mold after the slush casting material (either liquid plastisol or dry) is cast onto the surface of a preheated mold assembly as discussed in the aforementioned U.S. Pat. No. 4,389,177.

U.S. Pat. Nos. 2,834,986 and 2,893,057 disclose rotational casting machines for casting vinyl resins onto the surface of hollow mold forms. The machines have a single circular conveyor path which is in part used to preheat molds which are then charged with slush casting material such as vinyl resin and thereafter rotated to distribute the vinyl resin material onto the inner surface of the mold. The charge of mold material is selected to produce a desired thickness layer of vinyl material on the mold. Following the formation of a gel layer, the mold is directed through a curing oven and a cooling oven both of which are located on the single circular conveyor path. The machines do not provide for drain of plastisol nor do they provide for the extended length cure path of the present invention.

U.S. Pat. No. 4,028,038 discloses a rotational molding machine having six mold carriers mounted at equidistant points around a horizontal axis of the machine. Two coaxial shafts are connected to first and second drive wheels one of which rotates the mold on its axis and the other of which drives the mold with respect to index positions of the machine. The machine has a single circular conveyor path. The machine does not provide the extended length curing path of the present invention.

U.S. Pat. No. 3,151,196 discloses a molding system having the steps of filling, gelling, dumping excess slush cast plastisol and heating to fuse the gelled material. Thereafter the part is cooled and stripped from the mold. All the process steps are accomplished on a single, large diameter, circumferentially formed conveyor path.

None of the aforesaid patents disclose a dual arm assembly on which two molds are simultaneously gelled and cured and wherein mold reversing means are provided to sequentially position one or the other of the two molds in a respective gel or cure conveyor path.

SUMMARY OF THE INVENTION

The subject invention provides an improved method and apparatus for simultaneously filling molds and forming a gel coat thereon while simultaneously curing previously gelled molds by use of an arm assembly means having reversible motor means thereon for reversing the position of two molds following formation of a gel coat on one of the molds on a first conveyor path and to position the gel coated mold on a second conveyor path for curing the gelled material while shifting the other of the molds from the second conveyor path for passage through cooling and stripping stations on the first conveyor path.

A feature of the present invention is to provide an improved, low cost, compact arrangement for simultaneously forming a gel layer on a mold means and curing the gel layer by use of a conveyor having a reversible arm assembly means passed with respect to inner and outer conveyor paths one of which includes a filler to provide plastisol material to the mold means and the other of which includes a cure oven to fuse the gel layer.

Yet another object of the present invention is to provide an improved method and apparatus for providing for simultaneous formation of a gel layer on a heated mold means and for curing the gel layer following passage thereof into a curing oven and to do so by use of a conveyor having inner and outer circular paths, the inner one of which is occupied by a curing oven having an exit and an entrance means located on respective sides of a reversing station between the inner and outer circular conveyor paths.

Another feature of the present invention is to reduce the floor space requirements of mold apparatus for simultaneously forming a gel layer while curing a previously formed gel layer supported by the provision of a plurality of arm assemblies each carried by a rotatable conveyor having an inner circular path and an outer circular path into which one of a plurality of mold means are selectively positioned by the plurality of arm assemblies; each of which arm assemblies has means thereon for periodically reversing the position of opposite ends on the arm assembly to cause each of two molds to be selectively directed either along the inner circular path or the outer circular path so as to provide for simultaneous formation of a gelled layer on a first mold on the arm assembly means, while curing a previously formed gel layer on a second mold on the arm assembly.

Still another feature of the present invention is to provide a rotational mold apparatus having reduced floor space requirements and an extended cure path wherein an outer circular conveyor path includes means for sequentially filling the mold means with gellable plastisol material, means for gelling the layer of gelable material on the mold means, and means for dumping and draining excess plastisol material from the mold means and including a rotation station at which the position of the mold means on the arm assembly means is reversed to direct mold means from the outer circular path to an inner circular path having cure oven means along its length and wherein the reversed mold means from the inner circular path passes along the outer circular path with respect to means for cooling and stripping a cured part.

Still another feature of the present invention is to provide rotational mold apparatus of the type set forth in either of the preceding paragraphs wherein curing oven means are located on the inner circular path having an entrance and an exit thereon located on either side of the mold rotation station to provide an extended length cure path for directing fusing gel material on the mold means for curing the composition thereof prior to cooling and stripping of the part as mold means are passed along the outer circular path.

BRIEF DESCRIPTION OF THE DRAWINGS

Other advantages of the present invention will be readily appreciated as the same become better understood by reference to the following detailed description when considered in connection with the accompanying drawings wherein:

FIG. 3 is a diagrammatic view of a fill and heater station of the present invention;

FIG. 4 is a diagrammatic view of a dump and drain station of the present invention;

FIG. 5 is a diagrammatic view of a cooling station of the present invention.

DETAILED DESCRIPTION OF THE PREFERRED EMBODIMENT

Figure 1:
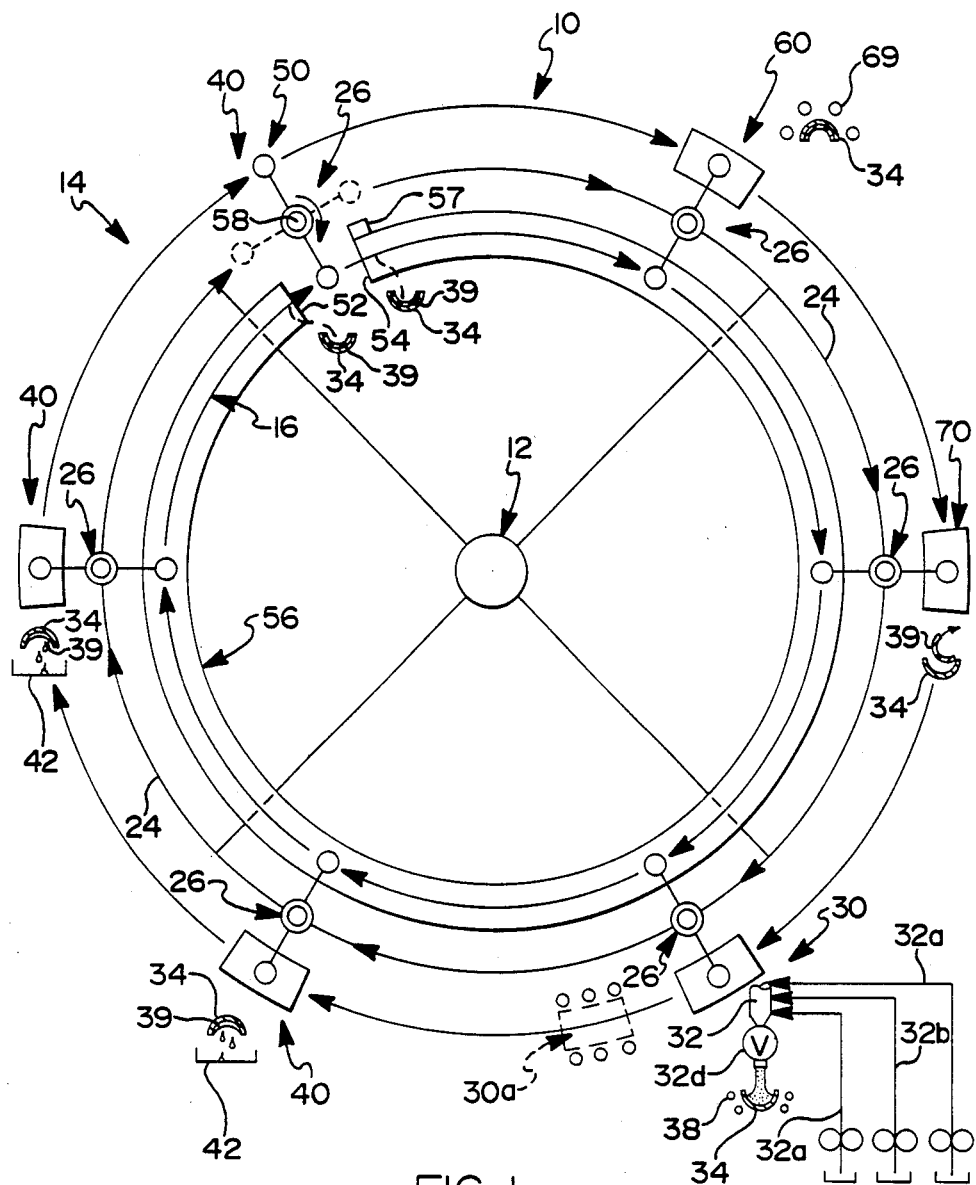
FIG. 1 is a diagrammatic plan view of a rotary mold apparatus including the present invention.

Referring now to FIG. 1, a rotary mold apparatus 10 is illustrated having a conveyor 12 which includes an outer circular path 14 and an inner circular path 16.

The conveyor 12 more particularly includes a drive motor 18 which connects to a post 20 having a side arm 22 connected thereto. The post is supported in a suitable bearing housing 23 for rotation about its vertical axis. The side arm 22 extends in a cantilevered fashion to one side of the post 20 where it connects to a ring 24 surrounding the post 20 circumferentially outwardly thereof. The ring 24 is rotated with the post 20 and the ring 24 is disposed intermediate the outer and inner circular paths 14, 16 as best shown in FIG. 1. A plurality of circumferentially spaced, reversing arm assemblies 26 are connected to the ring 24 by a bracket 28. The ring 24 is rotated to position mold means to be simultaneously filled in one of the circular paths while being cured in the other of the circular paths.

The arrangement of a conveyor 10 having concentrically arranged outer and inner circular paths 14, 16 provides a rotary mold apparatus of compact configuration which occupies less floor space than presently known rotary mold apparatus as well as an extended length inner path through which molds are directed to fuse slush casting material simultaneously with formation of a gel coat at stations on the outer conveyor path.

More specifically, as shown in FIG. 1, the outer circular path 14 is associated with a filler and gel station 30 at which slush casting material is directed through a suitable filler 32 into an open ended mold 34 with a mold cavity 36 defined by a mold surface 37 on which the slush casting material is gelled. Suitable slush casting material includes polyvinyl chloride with known plasticizers, stabilizers and viscosity depressants the formulation of which depends upon the part being molded on the mold apparatus 10. The present invention is not dependent upon a particular formulation for the slush casting material but rather is directed to the form of the apparatus for both simultaneously forming a gel layer while simultaneously curing previously cast gel layers on a continuous production line basis within limited plant floor spaces. Slush casting material is in the form of a plastisol which is a liquid material having vinyl (or other plastic) particles in a plasticizer which is dissolved into the particles when the plastisol is heated by contact with the mold surface 37.

The filler 32 can include several recirculation loops 32a, 32b, 32c for supplying different color plastisol on a programmed basis to different molds 34 which move into upright alignment with the filler 32.

The filler and gel station 30 further includes a suitable heater, representatively shown as an induction heater 38 which heats the mold 34 until the mold surface 37 reaches a temperature to cause a build-up of plastisol material thereon in the form of a gel layer 39. An induction heater 38 is provided for quick heat-up of the mold 34. Alternatively, other quick heat devices are equally suited for practicing the invention, e.g., high intensity gas feed flame heaters.

Figure 2:
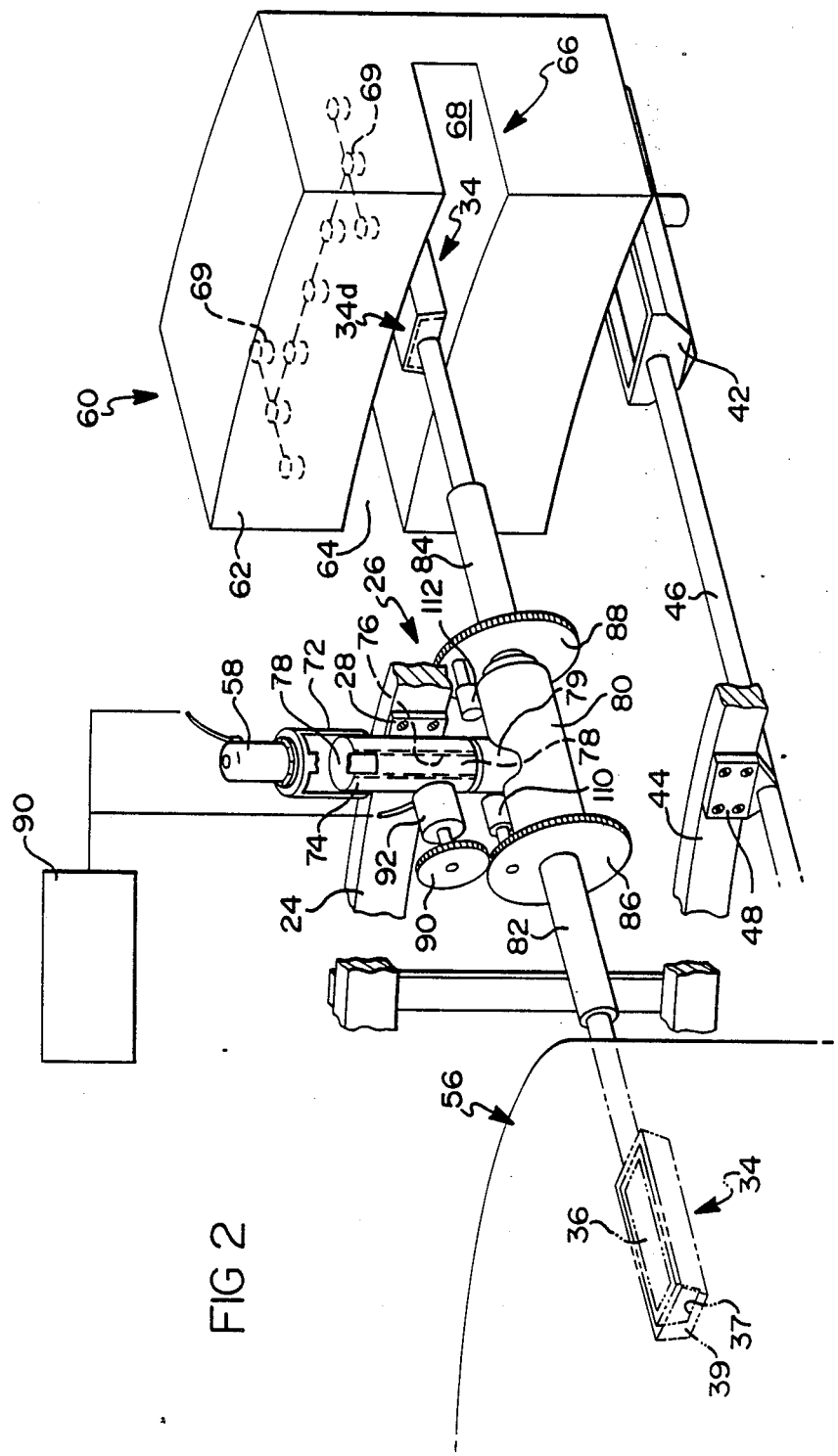
FIG. 2 is a fragmentary diagrammatic view of a reversible arm assembly in the rotary mold apparatus of the present invention.

The outer conveyor path 14 is also associated with a mold dump and drain station 40 at which the reversing arm assembly 26 is operated to invert the mold 34 to dump excess liquid plastisol into a drain pan 42 located beneath each of the reversing arm assemblies on a drain mount ring 44 by extension arms 46 connected at one end by a bracket 48 to the drain mount ring 44 and at the opposite end thereof to one end of the arm drain pan 42 as best shown in FIGS. 2 and 4. The mold 34 remains inverted for approximately 135 degrees of travel from the station 30 around the outer conveyor path to the mold rotation station 50 as shown in FIG. 1. The use of an individual drain pan 42 for each mold reduces color contamination since a given colored slush dumped from a mold will be returned through an outlet 42a on the drain pan 42 which includes a valve 42b selectively controlled to return the excess colored plastisol of one color to an inlet return 42c to one of the recirculation loops 32a-32c.

The mold rotation station 50 is located at the exit and entrance 52, 54 to a circular curing oven 56 that extends through substantially the full circumference of the inner conveyor path 16. The curing oven 56 is a gas fired unit having continuous of heated air maintained at a constant temperature level to fuse the plastisol in the gel layer 39. Products produced from vinyl plastisols require fusing. Other products made from plastisols of other material may require other post treatment which can be accomplished along the inner conveyor path 16. Suitable limit switches 57 are provided to sense position of the ring 24 at the mold rotation station 50 at which point the motor 18 is de-energized and the ring 24 is braked. At the same time the reversing arm assembly 26 is conditioned to cause a motor 58 thereon to rotate two molds 34 positioned at opposite ends of the reversing arm assembly 26 to cause a drained mold to enter the circular curing oven 56 and to cause a mold with a cured part thereon to return to the outer conveyor path 14 for passage through a mold cooling station 60 and a mold stripping station 70.

The mold cooling station 60 has a housing 62 with an entrance 64, exit 66 and a cooling chamber 68 into which cooling water is sprayed from spray nozzles 69 to cool a mold 34 with a fused plastisol part formed on the inner surface 37 thereof. Compress air can be used in place of water.

The mold stripping station 70 is located approximately 45 degrees around the outer conveyor path 14 from the cooling station 60. It locates the mold 34 in a position at which the cured or fused part can be pulled from the surface 37 after the mold is cooled at cooling station 60.

In accordance with certain principles of the present invention, the reversing arm assembly 26 is rotated by the motor 58 to position the molds 34 either for movement in the outer path 14 or for movement in the inner path 16 so that gel layers can be formed and cured simultaneously on a single reversing arm assembly 26.

More particularly, the motor 58 is supported on a spider bracket 72 secured to the top of a housing 74 having journal surface 76 for supporting the motor shaft 78. The shaft 78 is directed through the housing 74 to connect to a hub 79 on a shaft housing 80 supported below the ring 24 in a horizontal plane. The shaft housing 80 of each arm assembly 26 is rotatable by the motor 58 about its center point to place a drained mold 34 into the oven 54 and to place a mold with fused plastisol thereon on the outer path 14 whereby one arm end is always in the oven 56 and one end is always simultaneously located outside the oven 56. A first shaft 82 extends from one end of the housing 80 and a second shaft 84 extends from the opposite end of the housing 80. Each of the shafts 82, 84 are adapted to be connected to one of the open ended molds. A drive gear 86 is connected to the shaft 82 and a drive gear 88 is connected to the shaft 84. The drive gears 86, 88 are selectively meshed with a shaft driving gear 90 connected to the shaft of a percentage drive motor 92 that can be controlled by a programmable controller 94 to invert the mold to a dump position or revert it to an upright position in accordance with the programming of the controller 94 for carrying out the method sequence of FIG. 6. Hence, each arm end of the arm assembly 26 is rotated with respect to a horizontal plane to drain plastisol as controlled by the programmable controller 94.

Figure 6:
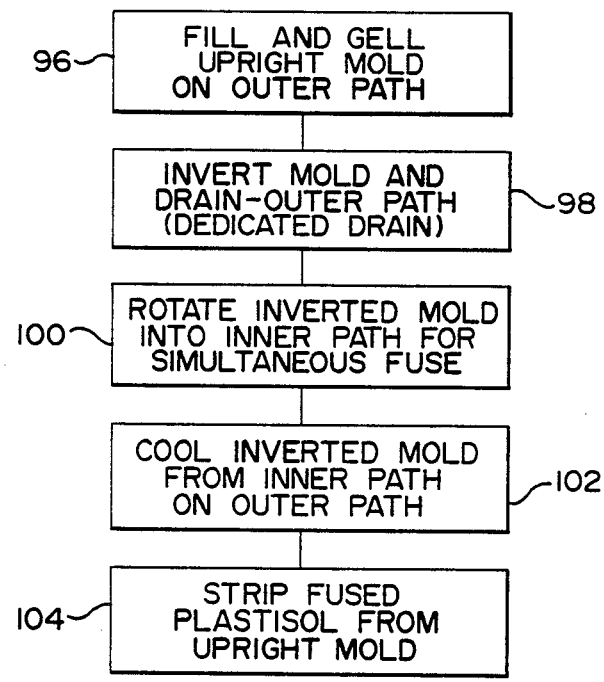
FIG. 6 is a flow chart of the method of the present invention.

As shown in FIG. 6 process block 96 designates a fill and gel step at the outer conveyor path wherein the mold is positioned upright; block 98 designates a dump and drain step wherein the mold is inverted to drain into a drain pan which is dedicated to one of the arm assemblies; block 100 designates a rotation step wherein a drained mold is maintained inverted and rotated from the outer path to the inner path; block 102 designates the cooling step wherein a previously rotated and fused part is located on a mold that is returned in its inverted position in the inner path to the cooling station to direct water spray against the outer surface of the mold to cool it for stripping the fused plastisol at the stripping step designated by the block 104.

The operation of the rotatable mold apparatus 10 to carry out the simultaneous fill and cure steps of the method of FIG. 6 includes a control sequence by the programmable controller 94 in which the drive motor 18 is turned on to move the ring 24 to move one of the arm assemblies 26 from the mold stripping or puller station 70 to the filler and gel station 30. The filler 32 is controlled to operate one of the recirculation loops 32a–32c to fill a mold 34 located on the outer loop 14 and positioned in an upright position by its arm assembly 26. The computer control opens and closes a valve 32d on the filler 32 to assure proper cut off of the filler 32 when the mold cavity 36 is filled with a proper color plastisol. The control also has conditions the percentage drive motor 92 to step it into a position which controls the angle of the mold 34 at the start of fill. Position lock pins 110, 112 are connected to the shaft housing 80. They are actuated when the mold angle is properly set to engage a hole in the drive gears 86, 88 respectively to lock the mold 34 in the proper angular position when at the various stations. In the illustrated embodiment the induction heater 38 is moved to the mold at the filler and gel station to rapidly raise the temperature of the mold to build-up a gel layer on the mold surface. Alternatively, a separate gel station can be provided circumferentially spaced from the station 30 the alternative station is shown in broken lines at 30a. In either case the RF coil of the induction heater is moved to surround the mold to raise the temperature to a level where a gel layer build-up is produced thereon.

The generator for the induction heater is computer controlled to fire the generator to raise the mold temperature and maintain it at a level to assure the desired build-up of the gel layer on the mold 34. The rapid, controlled heating forms a shell thickness of gelled plastisol on the inner surface 37 of the mold 34.

After the mold 34 passes through the gel station 30 (30a) all excess liquid plastisol is drained from the mold 34 to prevent further build-up of the shell thickness as set by the controlled gel process. Thus, under the computer control of the controller 94, the mold 34 is rotated by the motor 92 through any or all of a 360 degree dumping mode. The amount of the dumping rotation of the mold 34 is adjustable and can be repeated as the mold 34 traverses the dumping and drain station 40. The repeated inversion of the mold 34 will assure drainage of all the excess liquid plastisol from the build-up of gel on the mold 34 by the time the mold 34 reaches the mold rotation station 50.

Once the mold 34 reaches the rotation station 50, the drained mold 34 reverts to an upright position as shown in FIG. 5 and the entire arm housing 80 is rotated 180 degrees placing the drained mold 34 into the oven 56 for a one-minute fuse cycle or one revolution through the inner conveyor path 16. Simultaneously, the mold 34 which was fused in the oven is positioned outside the oven on the outer conveyor path 14 and is rotated by the motor 92 to invert the fused mold 34 prior to passage thereof through the cooling station.

Once the inverted mold 34 is in the cooling station 60 water and air are sprayed on the outer surface 34d of the mold to cool it. Computer control of the cooling time and temperature insures that each mold is precisely controlled at a temperature to stop the fusing process and to cool the shell enough to be easily handled by manual or machine pulling from the mold without tearing the resultant part during removal from the mold 34.

Industrial Applicability

The process and apparatus of the present invention are suited for the manufacture of any product having a shell configuration including but not limited to instrument panels for electronic and radio components, the outer covering for automotive instrument panels or other automotive trim parts, toys, garments, gloves, tool covers and the like.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows.

What is claimed is:

1. A method for forming cured plastisol parts in a process in which a heated mold is initially filled with an excess of plastisol material to form a gel layer thereon and the excess plastisol is returned to a plastisol supply followed by a fusion step wherein the gel material is cured in a curing oven comprising:
   providing conveyor means having a plurality of spaced reversing arm assemblies, each arm assembly having opposite ends carrying mold means thereon;
   providing first and second conveyor paths for the mold means on the opposite ends of each arm assembly and locating one of the first and second conveyor paths inside the outer perimeter of the other of the first and second conveyor paths;
   preheating mold means on one of the arm assemblies on the first conveyor path and filling the preheated mold means with an excessive charge of plastisol into the preheated mold means to form a gel layer thereon while on the first conveyor path and thereafter dumping plastisol from the preheated mold means for return to a supply source of plastisol;
   simultaneously curing a gel layer on mold means on another of the arm assemblies by directing the mold means through the second conveyor path as the preheated mold means on the other end of the arm assembly is being filled and dumped whereby the movement of an arm assembly produces simultaneous filling and curing of mold means on one of the arm assemblies and simultaneous dumping and curing of mold means on another of the arm assemblies.

2. In the method of claim 1, filling the plastisol in heated mold means as they are moved on the first conveyor path and curing the gel layer on previously filled mold means as they are moved on the second conveyor path.

3. In the method of claim 1, reversing the position of the heated mold means on the reversing arm assemblies following filling of the heated mold means and formation of a gel coat thereon and dumping to switch the path of movement of the heated mold means.

4. In the method of claim 1, filling the plastisol in heated mold means as they are moved on the first conveyor path and curing the gel layer on previously filled mold means as they are moved on the second conveyor path; and
   reversing the position of the heated mold means on the conveyor means following filling of the heated mold means and formation of a gel coat thereon to switch the path of movement of the heated mold means.

* * * * *